Figure 1:
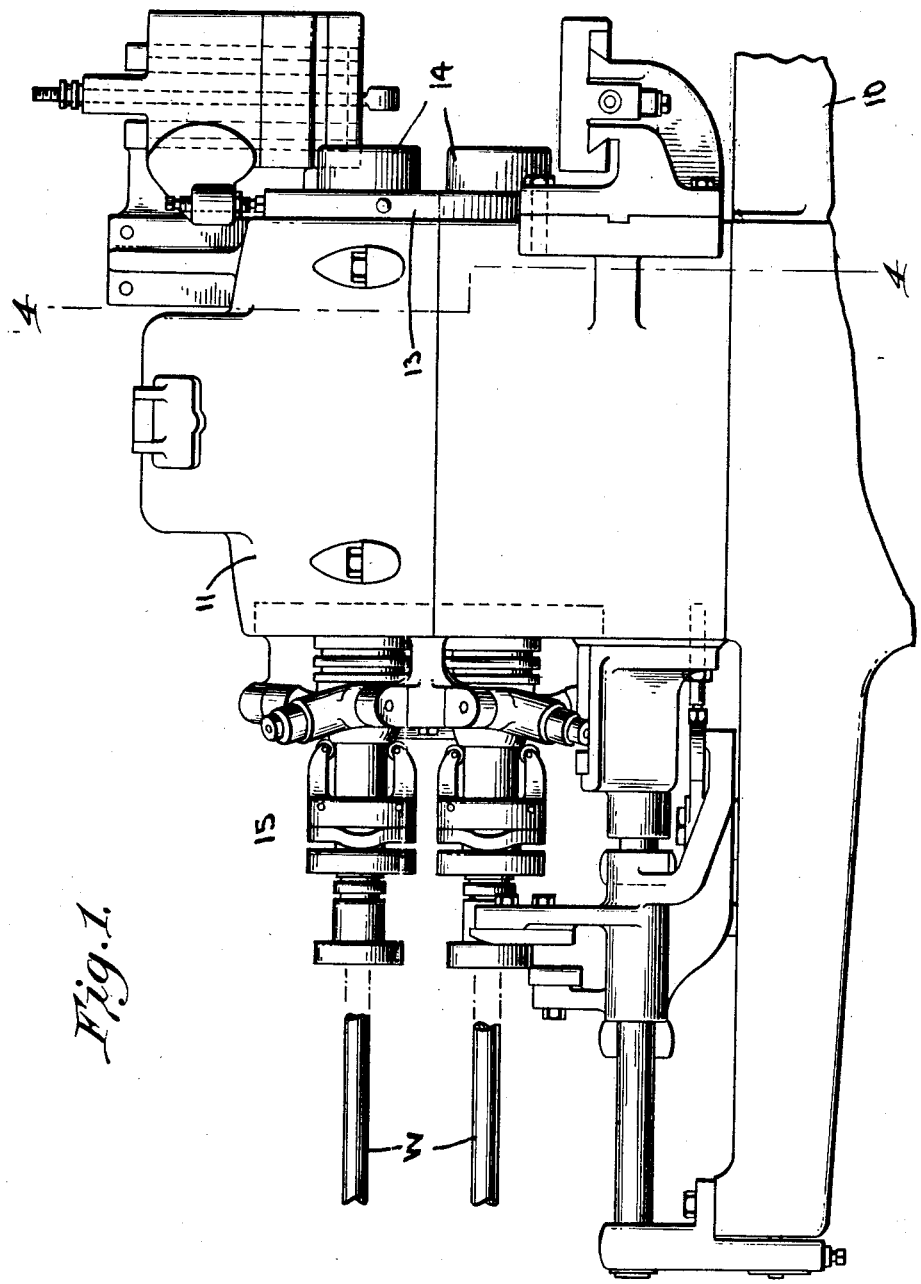

Inventor
John P. Brophy
By Fay Oberlin + Fay
Attorneys

Oct. 3, 1933.    J. P. BROPHY    1,928,925
INDEXING MECHANISM FOR MULTIPLE SPINDLE MACHINES
Original Filed May 12, 1923    3 Sheets-Sheet 3

Inventor
John P. Brophy

Patented Oct. 3, 1933

1,928,925

UNITED STATES PATENT OFFICE 1,928,925

INDEXING MECHANISM FOR MULTIPLE SPINDLE MACHINES

John P. Brophy, Cleveland, Ohio, assignor to The Cleveland Automatic Machine Company, Cleveland, Ohio, a corporation of Ohio Original application May 12, 1923, Serial No. 638,512. Divided and this application October 28, 1930. Serial No. 491,748

15 Claims. (Cl. 29—50)

The present invention relates to automatic machines of the metal working class and refers more particularly to a new and improved multiple spindle indexible turret type automatic machine wherein a plurality of blanks are rotatably supported in an indexible turret, and a number of forming tools carried in a reciprocating tool slide, are employed to engage the several blanks collectively during one complete movement of the tool slide.

My invention contemplates the provision of an automatic machine having an indexible spindle turret revolubly supporting a plurality of work holding spindles and having a tool slide carrying a number of cutting tools adapted to cooperate with said spindle to efficiently and expeditiously produce finished articles from bars of stock fed through the spindles. The machine herein provided is simple in construction, automatic in every operation, and capable of producing a better quality of work in greater capacity than existing machines of the same general character. In securing this end, I have devised the present novel multiple spindle indexible turret automatic machine in which are embodied certain important improvements capable of being utilized in machines other than the exact form disclosed herein.

This invention also comprehends the provision of means for giving the entire spindle turret body an initial impulse or "kick-off" in its advancing or indexing direction slightly ahead of the operation of the indexing mechanism proper, that is, in advance of the engagement of the indexing sector with the Geneva gear in the embodiment of the turret hereinafter referred to. By this construction I am able to speed up production and eliminate to a great degree the shock and wear on the various operating mechanisms caused by suddenly moving the heavy turret from a stationary position. Co-operating means is also provided for positively holding the turret with its spindles correctly aligned during the forming operations.

The above and other objects will more fully appear from the following description of the preferred embodiment of the invention described with reference to the accompanying drawings and will be especially pointed out in the appended claims.

In the drawings:—

Figure 2:
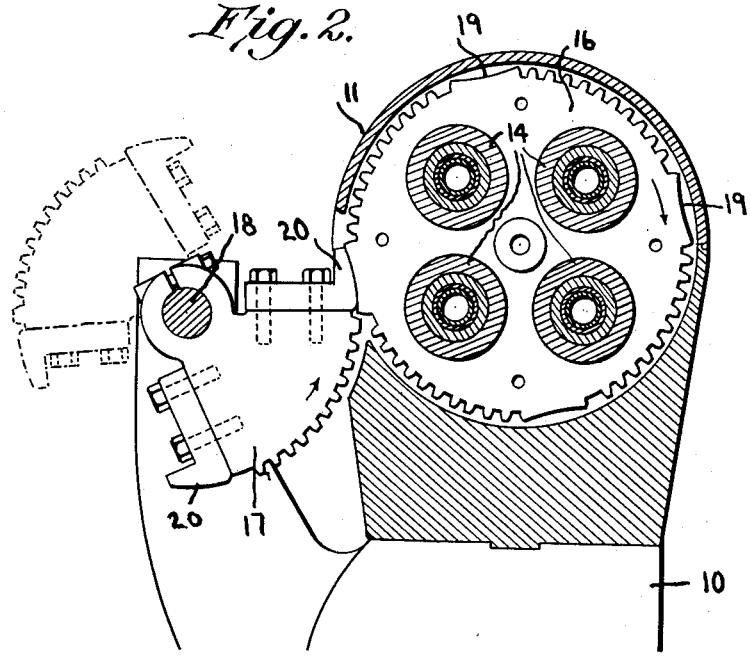
Figure 3:
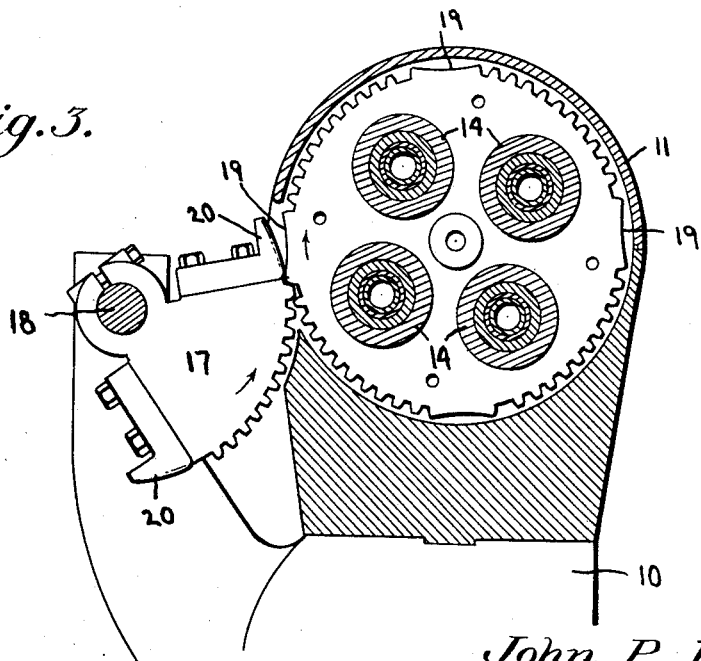
Figure 4:
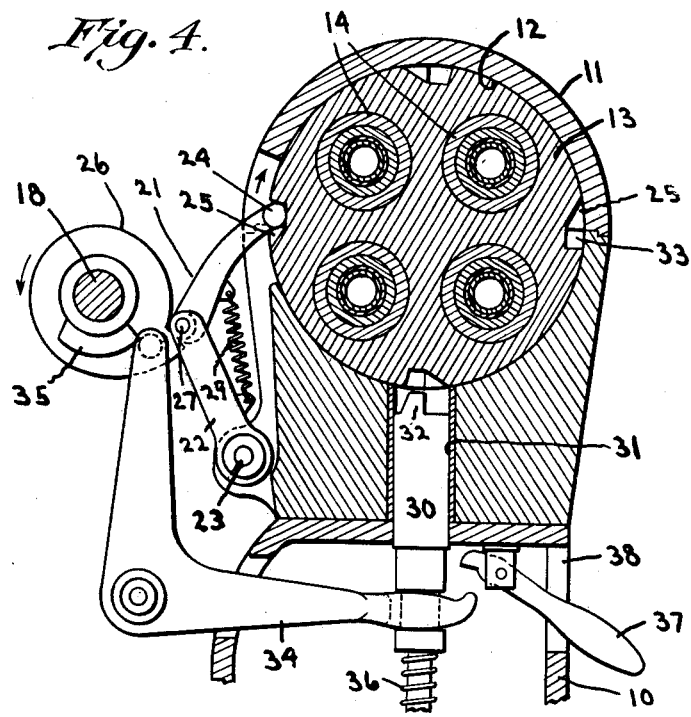
Figure 5:
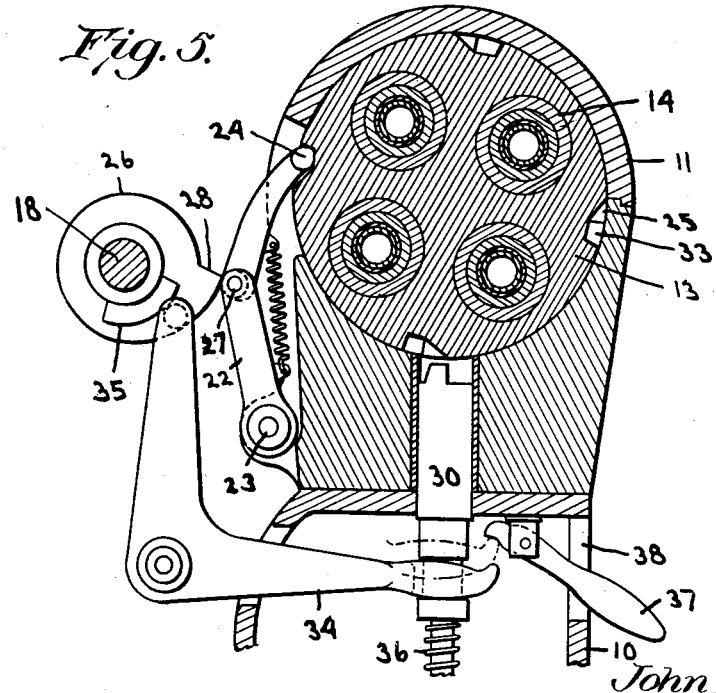

Fig. 1 is a front elevational view of the spindle turret end of my improved multiple spindle automatic machine; Fig. 2 is a transverse vertical sectional view through the spindle turret showing in detail the spindle turret indexing mechanism; Fig. 3 is a similar view showing the same elements in a different position; Fig. 4 is a transverse vertical sectional view through the spindle turret as taken on line 4—4 of Fig. 1 and showing the present improved auxiliary "kick-off" for the indexing of the spindle turret; and Fig. 5 is a view similar to Fig. 4 showing the same elements in a different position.

I have illustrated in the accompanying drawings the preferred embodiment of this invention which is shown in United States Patent No. 1,779,529 issued October 28, 1930 on my co-pending application Ser. No. 638,512 filed May 12, 1923, and have confined to the present illustrations only such features as are co-incident to the spindle turret and the indexing mechanism therefor.

In the drawings a portion of the bed plate of the machine is shown at 10 provided with a housing 11 fixed thereto, such housing having an internal cylindrical bore 12 in which is journaled the spindle turret 13. This spindle turret, in the present type multiple spindle machine, carries a plurality of work supporting spindles 14 arranged in parallelism and spaced equi-distant from the axis of the turret. Stock bars, as illustrated at W in Fig. 1, are received in the work spindles 14 and are intermittently fed therethrough by suitable stock feeding mechanisms illustrated generally at 15. As is general in the present type machine a number of forming tools are carried in opposed relationship to the stock bars at the forward end of the spindle turret, and are adapted to successively engage each stock bar to perform thereon its desired function. The spindle turret is indexed or moved bodily to advance each of the work spindles from one station to the next during each reciprocation of the tools.

Reference is made to applicant's aforesaid co-pending application for details of the stock feeding mechanism, the tools and their supports and feeding mechanisms.

As stated above, in the present machine several bars of stock are held in the rotatable spindles 14 and presented collectively to a set of forming tools, and the work spindles which are carried in the spindle turret 13 are indexed or moved a certain number of degrees between each reciprocation of the tools so as to present the stock in a different relationship for the next succeeding operation of said forming tools. The means herein provided for effecting such indexing comprises a sector gear 16 attached to or formed on the rear end of the spindle turret 13. Co-operating with this gear is a revolving sector gear 110

17 carried on the cam shaft of the machine illustrated at 18 and provided with only enough teeth to turn the gear 16 the desired number of degrees. The balance of the movement of said sector gear 17 provides sufficient time for the forming tools to function. Gear 16 may be of the well known Geneva type provided with interrupted portions 19 cooperating with complementary lugs 20 on the sector 17 to arrest the movement of the spindle turret and hold it until the turret locking means is actuated, which will be presently described. To compensate for the wear which occurs in the indexing mechanism lugs 20 are adjustably mounted on sector 17, which construction permits the necessary adjustment thereof to insure at all times a positive engagement of the lugs with the portions 19 of the spindle turret sector gear. In machines of this character, it is absolutely necessary that the spindle turret be stopped at the exact position so that the spindles will be correctly aligned with the forming tools.

Still further, this invention contemplates the provision of means whereby the spindle turret may be aided in its movement simultaneously with or just previous to the engagement of sector 17 with the gear 16. It will be apparent that the present machine and all others of this type are massive structures and that the spindle turret and mechanism carried thereby are quite heavy. To suddenly move such structure from a dead stop without the waste of time and to also arrest the movement of such structure abruptly, requires the use of heavy mechanism and results in considerable wear thereof. In order to overcome this wear to a great degree and to speed up the indexing operation of the spindle turret, I have devised the present novel means for giving the turret body an initial impulse or kick-off, just previous to the engagement of the sector gear. Such means may consist of a toggle lever connection 21 having one end 22 pivotally secured to the spindle turret housing at 23 and having the other end 24 thereof provided with a nose portion adapted to engage in suitable indentations 25 circumferentially provided in the spindle turret body 13. A cam 26 mounted on the cam shaft 18 engages the fulcrum pin 27 of the toggle connection to cause the closing thereof, which action will, as seen from Figs. 4 and 5, impart rotation to the turret body. The cam 26 has a sharply inclined portion 28 which is intended to engage the pin 27 and effect the sudden closing of the toggle, which action results in the quick movement or start of the spindle turret body. It will be understood that the cam 26 and toggle connection 21 are operated in timed conjunction with the sector 17 and that such toggle is only intended to start movement of the turret body. A spring 29 is used to return the toggle to open position, to keep the pin 27 against the cam 26, and to hold the end 24 against the spindle turret.

Also cooperating in timed relation with the indexing mechanism are means for locking the turret with its spindles in proper alignment. A slidable plug 30, movable in an aperture 31 in the casing 11 and having a suitable projection 32 to engage indentations 33 in the periphery of the turret body 13, is utilized for such locking means. Operating on the lower end of plug 30 is one end of a bell crank lever 34, the other end of which is engaged by a revolving cam plate 35 on the cam shaft 18. A spring 36 tends to force the plug upwardly and keep the bell crank against the cam 35. Means for manually withdrawing the plug and unlocking the spindle turret comprises a pivoted hand lever 37 adapted to have engagement with the end of the bell crank, said lever extending through a hole 38 in the front of the bed plate 10.

I therefore particularly point out and distinctly claim as my invention:—

1. In a machine of the character described, the combination of a housing, a revolving spindle turret mounted therein having its outer periphery provided with gear teeth, equidistantly spaced interrupted portions in said gear teeth, a rotating sector gear cooperating with said gear teeth, and adjustable lugs on said sector gear adapted to cooperate with said interrupted portions.

2. In a machine tool of the character described, the combination of a revoluble spindle turret, means for intermittently revolving said turret, and means for starting the rotation of said turret cooperating with said first named means to perform the indexing operation.

3. In a machine of the character described, the combination of a revoluble spindle turret, means for intermittently revolving said turrett, and means for starting movement of said turret, said starting means acting simultaneously with said first named means.

4. In a machine of the character described, the combination of a revoluble spindle turret, means for intermittently revolving said turret, and means operable simultaneously with it during the first part of the movement of said revolving means for imparting to said turret an accelerated start whereby said turret may be immediately brought from a dead stop to the turning speed.

5. In a machine of the character described, the combination of a revoluble spindle turret, means for intermittently revolving said turret, means for locking said turret in place during the non-rotation thereof, and means operating simultaneously with said revolving means for starting the rotation of the turret.

6. In a machine of the character described, the combination of a revoluble spindle turret, a rotating shaft, means carried on said shaft for intermittently revolving said turret, and means operable from said shaft adapted to start the rotation of said turret.

7. In a machine of the character described, the combination of a housing, a rotatable spindle turret supported by said housing, a driving shaft supported adjacent said turret, Geneva gearing supported by said turret and said shaft for intermittently indexing said turret, and independent means actuated by said shaft in timed relation to the indexing operation for initiating the movement of said turret.

8. In a machine of the character described, the combination of a revoluble spindle turret having a plurality of equidistantly spaced indentations in its outer periphery, means for intermittently revolving said turret, and means adapted to engage in one of said indentations and aid in the starting movement of said turret.

9. In a machine of the character described, the combination of a revoluble spindle turret having a plurality of indentations in its outer periphery, a pivoted toggle having one end adapted to engage in one of said indentations, and means for straightening said toggle whereby rotary movement is imparted to said turret.

10. In a machine of the character described, the combination of a revoluble spindle turret having a plurality of indentations in its outer periphery, means for intermittently revolving said turret, a pivoted toggle having one end adapted to engage in one of said indentations, and means cooperating with said revolving means for intermittently straightening said toggle.

11. In a machine of the character described, the combination of a revoluble spindle turret having a plurality of indentations in its outer periphery, means for intermittently revolving said turret, a pivoted toggle having one end adapted to engage in one of said indentations, means cooperating with said first named means for straightening said toggle, and means for keeping said end of the toggle against the periphery of said turret.

12. In a machine of the character described, the combination of a housing, a revoluble spindle turret mounted therein, said turret having a plurality of indentations formed in its outer periphery, a rotating shaft, means carried on said shaft for intermittently revolving said turret, a pivoted toggle having one end adapted to engage in one of said indentations, and means carried on said shaft for intermittently actuating said toggle.

13. In a machine of the character described, the combination of a housing, a revoluble spindle turret mounted therein, said turret having a plurality of indentations formed in its outer periphery, a rotating shaft, a pivoted toggle having one end adapted to engage in one of said indentations, means for keeping said end in engagement with said turret, and a cam mounted on said shaft adapted to intermittently actuate said toggle.

14. In a machine of the character described, the combination of a housing, a revoluble spindle turret mounted longitudinally therein, said turret having a plurality of equidistantly spaced indentations formed in its outer periphery, means operable through an opening in said housing adapted to engage in one of said indentations, and means adapted to intermittently actuate said first named means whereby the turret is intermittently rotated.

15. In a machine of the character described, the combination of a housing, a rotatable spindle turret supported by said housing, a driving shaft supported adjacent said turret, Geneva gearing supported by said turret and said shaft for intermittently indexing said turret within said housing, a plurality of indentations formed in the outer periphery of said turret, a pivoted toggle having one end pivotally connected to said housing and the other end adapted to engage in said indentations, and a cam on said driving shaft for straightening said toggle in predetermined timed relation to the indexing operation to initiate the movement of said turret.

JOHN P. BROPHY.